(12) United States Patent
Matsuoka et al.

(10) Patent No.: US 8,231,028 B2
(45) Date of Patent: Jul. 31, 2012

(54) PRESSURE RESISTANT CONTAINER WITH SEALED MOUTH ENTRANCE

(75) Inventors: Seiichi Matsuoka, Tokyo (JP); Yoji Arakawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 801 days.

(21) Appl. No.: 12/294,758

(22) PCT Filed: Mar. 20, 2007

(86) PCT No.: PCT/JP2007/055632
§ 371 (c)(1),
(2), (4) Date: Sep. 26, 2008

(87) PCT Pub. No.: WO2007/119444
PCT Pub. Date: Oct. 25, 2007

(65) Prior Publication Data
US 2010/0163565 A1 Jul. 1, 2010

(30) Foreign Application Priority Data
Mar. 29, 2006 (JP) ................................ 2006-091106

(51) Int. Cl.
*F17C 1/02* (2006.01)
*F17C 13/04* (2006.01)
*F17C 13/06* (2006.01)
(52) U.S. Cl. ......... 220/582; 220/587; 220/592; 220/601
(58) Field of Classification Search .................. 220/582, 220/586, 587, 601
See application file for complete search history.

(56) References Cited

U.S. PATENT DOCUMENTS 3,606,348 A * 9/1971 Taylor ............................ 277/328
3,907,149 A * 9/1975 Harmon ........................ 220/590
3,917,115 A * 11/1975 Travers et al. ..................... 222/3
(Continued)

FOREIGN PATENT DOCUMENTS
DE   197 51 411 C1   1/1999
(Continued)

OTHER PUBLICATIONS

PCT International Preliminary Report on Patentability (Form PCT/IB/373) issued Oct. 21, 2008 for Application No. PCT/JP2007/055632 (in English).

(Continued)

*Primary Examiner* — J. Gregory Pickett
*Assistant Examiner* — Ned A Walker
(74) *Attorney, Agent, or Firm* — Smith, Gambrell & Russell, LLP (57) ABSTRACT

A pressure-resistant container has a peripheral part of an inner shell opening attached to a mouth ring end surface inside of the container to cover the mouth ring. The pressure-resistant container has a cylindrical pressing member screwed into an inner peripheral surface of the mouth ring, an inner peripheral surface of the mouth ring extends between the inner shell and the pressing member, a first seal peripherally contacts the inner shell and the pressing member, a valve having a screw part screws into the mouth ring more outside of the container than the pressing member and an inner end part which is inserted in the hole part of the pressing member and a second seal to seal between an outer peripheral surface of the inner end part and an inner peripheral surface of the pressing member. A third seal is also provided.

17 Claims, 6 Drawing Sheets

U.S. PATENT DOCUMENTS

| | | | | |
|---|---|---|---|---|
| 4,690,295 | A * | 9/1987 | Wills | 220/590 |
| 5,253,778 | A | 10/1993 | Sirosh | |
| 5,287,987 | A * | 2/1994 | Gaiser | 220/589 |
| 5,429,845 | A * | 7/1995 | Newhouse et al. | 428/34.1 |
| 5,494,188 | A * | 2/1996 | Sirosh | 220/590 |
| 5,839,600 | A * | 11/1998 | Moreira et al. | 220/560.04 |
| 5,938,209 | A * | 8/1999 | Sirosh et al. | 277/622 |
| 6,089,399 | A * | 7/2000 | Felbaum et al. | 220/582 |
| 6,186,356 | B1 * | 2/2001 | Berkley et al. | 220/582 |
| 6,227,402 | B1 * | 5/2001 | Shimojima et al. | 220/581 |
| 6,230,922 | B1 * | 5/2001 | Rasche et al. | 220/586 |
| 7,032,767 | B2 * | 4/2006 | Funck | 220/586 |
| 7,032,768 | B2 * | 4/2006 | Felbaum | 220/582 |
| 7,556,171 | B2 * | 7/2009 | Ishimaru | 220/586 |
| 7,648,042 | B2 * | 1/2010 | Lee et al. | 220/601 |
| 7,731,051 | B2 * | 6/2010 | Rohwer et al. | 220/586 |
| 7,971,852 | B2 * | 7/2011 | Otsubo et al. | 251/144 |
| 2004/0182869 | A1 * | 9/2004 | Kubo et al. | 220/581 |
| 2004/0206762 | A1 * | 10/2004 | Iida et al. | 220/581 |
| 2007/0012551 | A1 * | 1/2007 | Rohwer et al. | 200/61.22 |
| 2007/0111579 | A1 * | 5/2007 | Ishimaru | 439/312 |
| 2007/0164561 | A1 * | 7/2007 | Kwon et al. | 285/45 |
| 2008/0111322 | A1 * | 5/2008 | Otsubo et al. | 277/654 |
| 2009/0255940 | A1 * | 10/2009 | Murate et al. | 220/592 |

FOREIGN PATENT DOCUMENTS

| | | |
|---|---|---|
| EP | 0 550 951 | 11/1995 |
| JP | 5-88665 | 12/1993 |
| JP | 6-42698 | 2/1994 |
| JP | 6-137433 | 5/1994 |
| JP | 7-310895 | 11/1995 |
| JP | 8-219387 | 8/1996 |
| JP | 10-332085 | 12/1998 |
| JP | 2001-214998 | 8/2001 |
| JP | 2001-524653 | 12/2001 |
| JP | 2002-537530 | 11/2002 |
| JP | 2005048919 A * | 2/2005 |
| JP | 2005-113971 | 4/2005 |
| JP | 2007155116 A * | 6/2007 |
| WO | WO 2007055343 A1 * | 5/2007 |

OTHER PUBLICATIONS

English translation of the PCT Written Opinion of the International Searching Authority (Form/ISA/237) issued Oct. 20, 2008 for Application No. PCT/JP2007/055632.

Extended European Search Report dated Jun. 6, 2011 for Application No. EP 07 73 9075.

* cited by examiner

PRESSURE RESISTANT CONTAINER WITH SEALED MOUTH ENTRANCE

TECHNICAL FIELD

The present invention relates to a pressure-resistant container in which an inner shell made of a resin is covered with an outer shell made of a fiber reinforced composite material.

BACKGROUND ART

In recent years, the so-called nonpolluting automobiles have been developed, and a part of them has been put to practical use with the aim of preventing the environmental deterioration caused by the exhaust gas of automobiles. For example, an automobile operating by means of a natural gas in which methane is the main component as the fuel has been authorized as a low pollution automobile, and about one million units of the automobiles have been actually used already all over the world.

Moreover, it is thought that a fuel cell powered automobile using hydrogen as its fuel will substitute for most of the current gasoline-driven automobiles in the future. There is a possibility that the natural gas and hydrogen that are used here are compressed natural gas and compressed hydrogen, respectively, and it is thought that the pressures will be ultra-high pressures, such as 20 MPa to 25 MPa for the natural gas and 35 MPa to 70 MPa for hydrogen. Consequently, a tank (pressure-resistant container) having a pressure-resistant performance is needed, and a high pressure tank made of steel has been used conventionally.

When natural gas and hydrogen are used as the fuels of automobiles, it is preferred that the tanks to be mounted are light weighted from the point of view of the improvement of engine performance, the improvement of fuel consumption and the like. A tank made of an aluminum liner which is reinforced with carbon fibers has been used as an alternative for the steel tank. However, a tank using a resin liner in which the entire tank is made of resin has been developed in order to achieve further lightweight (for example, Patent Document 1).

The tank made of resin liner is a gas tank composed of a resin inner shell (inner wall) having a gas barrier property and a fiber reinforced plastic (FRP) outer shell (outer wall) having a pressure resistance property wherein the outer shell covers the inner shell, and is lighter than a metal tank because the tank made of resin liner is mainly made of resin.

This sort of gas tank is provided with a nozzle attaching mouth ring in order to attach a nozzle for filling a gas into the tank and for taking the gas out from the tank.

The mouth ring portion is generally joined with the inner shell integrally. The mouth ring portion for screwing the nozzle or the like is generally made of a metal, and the inner shell is made of a material (the above mentioned resin, FRP or a light metal) different from that of the mouth ring portion from the point of view of the weight saving or the simplification of the manufacturing process. Because the mouth ring portion and the inner shell which are made of different materials from each other are integrally joined, the sealing property of the joined part or the interface part of the inner shell and the mouth ring portion becomes important.

In particular, because the high pressure gas up to about 70 MPa is filled in the gas tank which is called the above mentioned high pressure natural gas tank or high pressure hydrogen gas tank for an automobile, an extremely high gas sealing property is required. The conventional gas tank yet has insufficient gas sealing property of the joined part or the interface part of the inner shell and the mouth ring portion.

Patent Documents 2 to 5 propose pressure-resistant containers having improved gas sealing property of the mouth ring portion in the high pressure gas tanks made of resin.

The pressure-resistant container described in Patent Document 2 has the structure of enhancing the gas sealing property of the mouth ring portion by adopting the structure of receiving a disk-like flange part of the mouth ring portion with upper and lower lips at the end part of the inner shell.

However, in the pressure-resistant container described in Patent Document 2, the end part of the mouth ring is exposed to its internal gas, and the internal pressure of the gas is directly applied to the end part of the mouth ring portion. Consequently, even when gas leakage does not occur just after the manufacturing of the pressure-resistant container, creeping occurs in the resin of the inner shell to shrink and a gap is generated at an interface of the inner shell and the mouth ring while using the container for a long time. Thus, there is a possibility that gas leakage might occur from the gap at the interface.

Moreover, in the pressure-resistant container described in Patent Document 3, locking grooves are provided at the upper and lower surfaces of a disk-like flange part of the mouth ring, and a tab which fits with the upper and lower locking groove is formed at the end part of the inner shell to join the upper and lower locking grooves. Thereby, the pressure-resistant container is structured so as to oppose the force which tears off both the lips with the locking groove, which force is a shearing force operates on both the lip parts joined to the locking groove at the upper and lower surfaces of the disk-like flange when the inner shell swells at the time of the swelling of the container by an internal pressure when a high pressure gas is kept in the pressure-resistant container.

However, in the pressure-resistant container described in Patent Document 3, the end part of the mouth ring is also exposed to the internal gas, and the internal pressure of the gas is applied directly to the end part of the mouth ring. Consequently, there is possibility that gas leakage might occur by the same reason as described above.

Furthermore, the pressure-resistant container described in Patent Document 4 aims to enhance the gas sealing property by adopting the following structure: the mouth ring intervenes at the inner side of the opening part of the inner shell manufactured by the blow molding; a sealing ring made of rubber or the like is fitted to the shoulder part of the inner shell; the sealing ring is pressed by a pressing member made of a metal or the like; and filament winding molding is performed thereover. Even when the pressing member of the sealing ring is made of a metal, the fitting part of the sealing ring is only structured with the resin-made inner shell. Therefore, even when a gas leakage does not occur right after the manufacturing of the pressure-resistant container, the plastic of the inner shell creeps and the inner shell shrinks while the container is being used for a long time. Thus, there is a possibility that gas leakage might occur in the pressure-resistant container similarly as the pressure-resistant containers described in Patent Documents 2 and 3. Even when it is tempted to increase the number of sealing ring in response to the shrinking of the inner shell, the product container is needed to be disassembled, and further in the case of exchanging a deteriorated sealing, the product container is also needed to be disassembled, and it is not only troublesome but also uneconomical.

As a pressure-resistant container to solve the problem which is common to the above pressure-resistant containers described in Patent Documents 2 to 4, there is the pressure-resistant container described in Patent Document 5.

In the container described in Patent Document 5, a cylindrical neck part, a tabular extending part extending outward and a bent part bent to the inner shell side are successively connected to the pole portion of the inner shell, and the cross section of the end part of the inner shell is bended to the inner shell side to be embedded in the mouth ring and an O-ring is jointly used between the pressing part and the extending part. Thereby, the end part of the mouth ring is prevented from being exposed to the internal gas and the internal pressure of the gas is prevented from being applied directly to the end part of the mouth ring.

However, in this method, although one side is the pressing member made of metal which can secure the surface accuracy relatively easily, the other side is made of plastic which cannot secure the surface accuracy. Consequently, this structure lacks the reliability of sealing. Moreover, it is needed to use rotational molding which takes long time for the molding of the plastic liner of the inner shell in order to bend the cross section of the end part of the inner shell to the inner shell side to be embedded into the mouth ring, and the lowering of the cost of the inner shell is prevented. Moreover, in order to support the bent part of the inner shell with the end part of the mouth ring in the inner side of the tank, the end part is formed so as to project toward the inner side. The projecting part causes no problem in the case of a relatively low pressure tank. However, the bending strength of the mouth ring at the projecting part by the internal pressure of the tank becomes severe in an ultra high pressure tank, such as 70 MPa, and there is a possibility that the breaking of the mouth ring occurs in a repetition cycle.

Patent Document 1: Japanese Patent Publication No. Hei 5-88665
Patent Document 2: Japanese Patent Application Laid-Open Publication No. Hei 6-42698
Patent Document 3: Japanese Patent Application Laid-Open Publication No. Hei 6-137433
Patent Document 4: Japanese Patent Application Laid-Open Publication No. Hei 8-219387
Patent Document 5: Japanese Patent Application Laid-Open Publication No. Hei 10-332085

DISCLOSURE OF THE INVENTION

Problem to be Solved by the Invention

However, the pressure-resistant container described in Patent Document 5 also has the following problem. That is, even when one side is the pressing member made of metal which can easily secure its surface accuracy, the other side is made of plastic which cannot secure its surface accuracy. Consequently, this structure lacks the reliability of sealing.

Moreover, in order to embed the edge part of the inner shell into the mouth ring in a shape of being bent outside, the mouth ring is needed to be set in a centrifugal mold and the rotational molding which takes a long time is needed to be used for the molding of the plastic liner of the inner shell, and thereby the lowering of the cost of the inner shell is prevented.

Moreover, in order to support the bent part of the inner shell with the end part of the mouth ring at the inner side of the tank, the end part of the mouth ring is formed so as to project to the inner side. The projecting part causes no problem in the case of a relatively low pressure tank. However, the bending strength of the mouth ring at the projecting part by the internal pressure of the tank becomes greater in an ultra high pressure tank, such as 70 MPa, and there is a possibility that the breaking of the mouth ring occurs in a repetition cycle.

The present invention was completed as the result of a keen examination in order to provide a pressure-resistant container which solves the above several problems at once, and the object of the present invention is to make the manufacturing of the pressure-resistant container in which the inner shell is covered with the outer shell easy and to enhance the gas sealing property at the edge part (interface part) of the covering where the inner shell and the mouth ring adheres to one another.

Means for Solving the Problem

The invention of claim 1 for solving the above problem is a pressure-resistant container comprising an inner shell, an outer shell to cover the inner shell, a cylindrical mouth ring to penetrate the outer shell to be connected to an opening formed at the inner shell, a peripheral part of the opening at the inner shell covering an end surface of the mouth ring at an inner side of the container, a cylindrical pressing member screwed into an inner peripheral surface of the mouth ring, a first seal peripherally contacting with the inner peripheral surface of the mouth ring which is exposed between the inner shell and the pressing member and with a periphery of the opening of the inner shell in an integral manner, a valve having a screw part screwed into the inner peripheral surface of the mouth ring at an outer side of the container than the pressing member and having an inner end part inserted into a hole part of the pressing member and a second seal for sealing between an outer peripheral surface of the inner end part and an inner peripheral surface of the pressing member.

Here, "peripherally contacting" means contacting with the other material so as to go around the material (the same applies hereinafter).

The invention according to claim 2 is the pressure-resistant container as claimed in claim 1, wherein the first seal peripherally contacts with the inner peripheral surface of the mouth ring which is exposed between the inner shell and the pressing member, the periphery of the opening of the inner shell and the pressing member in the integral manner.

The invention according to claim 3 is the pressure-resistant container as claimed in claim 1 or 2, wherein the peripheral part covers a predetermined range of the inner peripheral surface of the mouth ring by peripherally contacting with the predetermined range continuously to the end surface of the mouth ring at the inner side of the container.

The invention according to claim 4 is The pressure-resistant container as claimed in claim 3, wherein the peripheral part comprises an extending part which extends from a covering part of the predetermined range toward an inner part of the mouth ring, and the first seal peripherally contacts with the extending part.

The invention according to claim 5 is the pressure-resistant container as claimed in any one of claims 1 to 4, wherein a flange which is sandwiched between the outer shell and the inner shell is formed at an end part of the mouth ring at the inner side of the container.

The invention according to claim 6 is the pressure-resistant container as claimed in claim 5, wherein the second seal is disposed at an inner side of the container than a joining position of the flange and a cylindrical neck part of the mouth ring.

The invention according to claim 7 is the pressure-resistant container as claimed in any one of claims 1 to 6, wherein the first seal is a liquid sealant.

The invention according to claim 8 is the pressure-resistant container as claimed in any one of claims 1 to 6, wherein the first seal is an O-ring and a liquid sealant adhering to the O-ring.

The invention according to claim 9 is the pressure-resistant container as claimed in any one of claims 1 to 8, wherein a liquid sealant is attached between an outer peripheral surface of the pressing member and the inner peripheral surface of the mouth ring opposed to the outer peripheral surface of the pressing member.

The invention according to claim 10 is the pressure-resistant container as claimed in any one of claims 1 to 9, wherein a liquid sealant is attached between an end surface of the pressing member at an outer side of the container and the inner peripheral surface of the mouth ring.

The invention according to claim 11 is the pressure-resistant container as claimed in any one of claims 1 to 10, wherein the second seal is an O-ring.

The invention according to claim 12 is the pressure-resistant container as claimed in claim 11, wherein a circumferential groove to hold the O-ring of the second seal is formed at an outer peripheral surface of the inner end part.

The invention according to claim 13 is the pressure-resistant container as claimed in any one of claims 1 to 12, wherein a flange part is provided at an end part of the valve at an outer side of the container, and a third seal is provided to seal a part between the flange part and an end surface of the mouth ring at the outer side of the container.

The invention according to claim 14 is the pressure-resistant container as claimed in claim 13, wherein the third seal is an O-ring.

The invention according to claim 15 is the pressure-resistant container as claimed in any one of claims 1 to 14, wherein the inner shell is made of a resin, and the outer shell is made of a composite material of a fiber reinforced resin.

EFFECT OF THE INVENTION

According to the invention described in claim 1, the first seal peripherally contacts with the inner peripheral surface of the mouth ring which is exposed between the inner shell and the pressing member and a periphery of the opening of the inner shell in an integral manner. Consequently, the gas sealing property of the edge part of the covering where the inner shell and the mouth ring adhere to one another can be enhanced, and thereby an effect of realizing the high pressure resistance property of the container is obtained.

According to the invention described in claim 2, the first seal peripherally contacts with the inner peripheral surface of the mouth ring which is exposed between the inner shell and the pressing member, the periphery of the opening of the inner shell and the pressing member in an integral manner. Consequently, the edge part of the covering where the inner shell and the mouth ring adhere to one another can be sealed. Furthermore, because the second seal seals the part between the outer peripheral surface of the inner end part of the valve and the inner peripheral surface of the pressing member, the internal gas will not go around the end part of the pressing member at the outer side of the container to enter the edge part of the covering where the inner shell and the mouth ring adhere to one another, and consequently the gas sealing property of the edge part of the covering where the inner shell and the mouth ring adhere to one another can be enhanced. Thus, the effect of realizing the high pressure resistance property of the container is obtained.

Moreover, because it is sufficient for the inner shell to cover at least the end surface of the mouth ring at the inner side of the container, a molding technique having good productivity, such as the blow molding, can be applied to the inner shell before attaching the mouth ring thereto, and the mouth ring that has been configured separately can be attached to the inner shell by adhesion, welding or the like, after the molding of the inner shell. Consequently, the effect of making the manufacturing of the pressure-resistant container easy to reduce the cost is obtained.

BEST MODE FOR CARRYING OUT THE INVENTION

Hereinafter, an embodiment of the present invention will be described with reference to the drawings. The following are the embodiments of the present invention and they do not limit the present invention.

[First Embodiment]

First, the first embodiment of the present invention will be described with reference to FIGS. 1 to 3.

Figure 1:
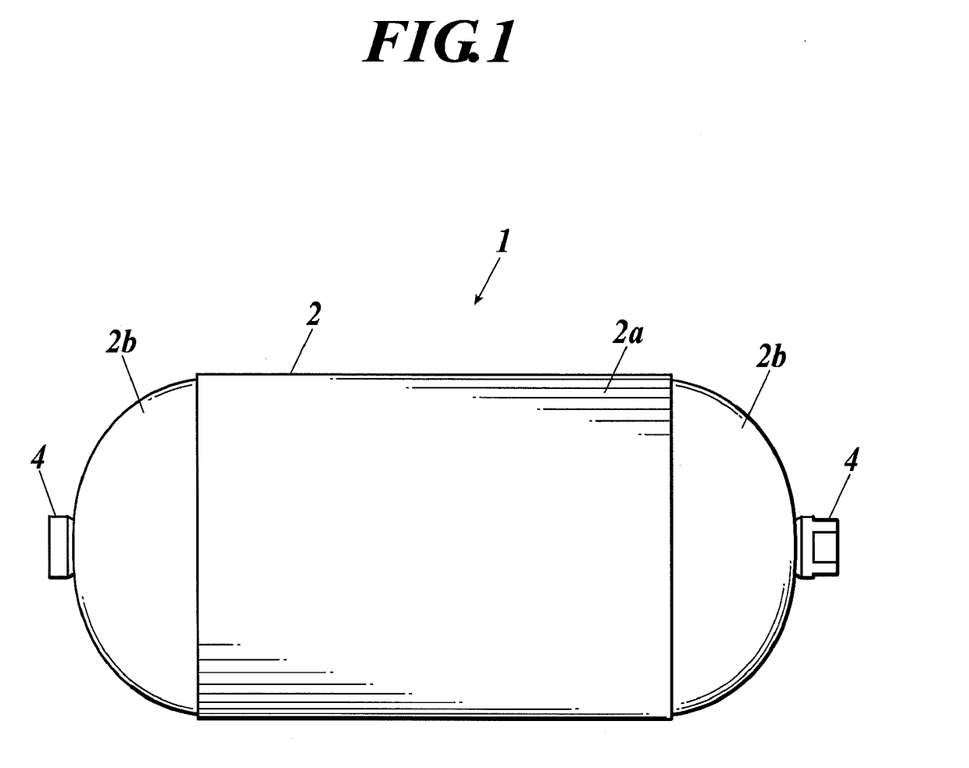
FIG. 1 is an outline view of the entire pressure-resistant container according to the first and the second embodiments of the present invention.

FIG. 1 is an outline view of the entire pressure-resistant container according to the first embodiment of the present invention.

As shown in FIG. 1, the pressure-resistant container 1 of the present embodiment comprises an outer shell 2 and mouth rings 4. The outer shell 2 is made of a composite material of a fiber reinforced resin such as CFRP, and is composed of a cylinder part 2*a* and dome parts 2*b* and 2*b* continuing from both ends of the cylinder part 2*a*. The outer shell 2 covers an inner shell (omitted from the drawing). The mouth rings 4 are provided at the peak parts of the dome parts 2*b* and 2*b*. Only one mouth ring may be provided.

Figure 2:
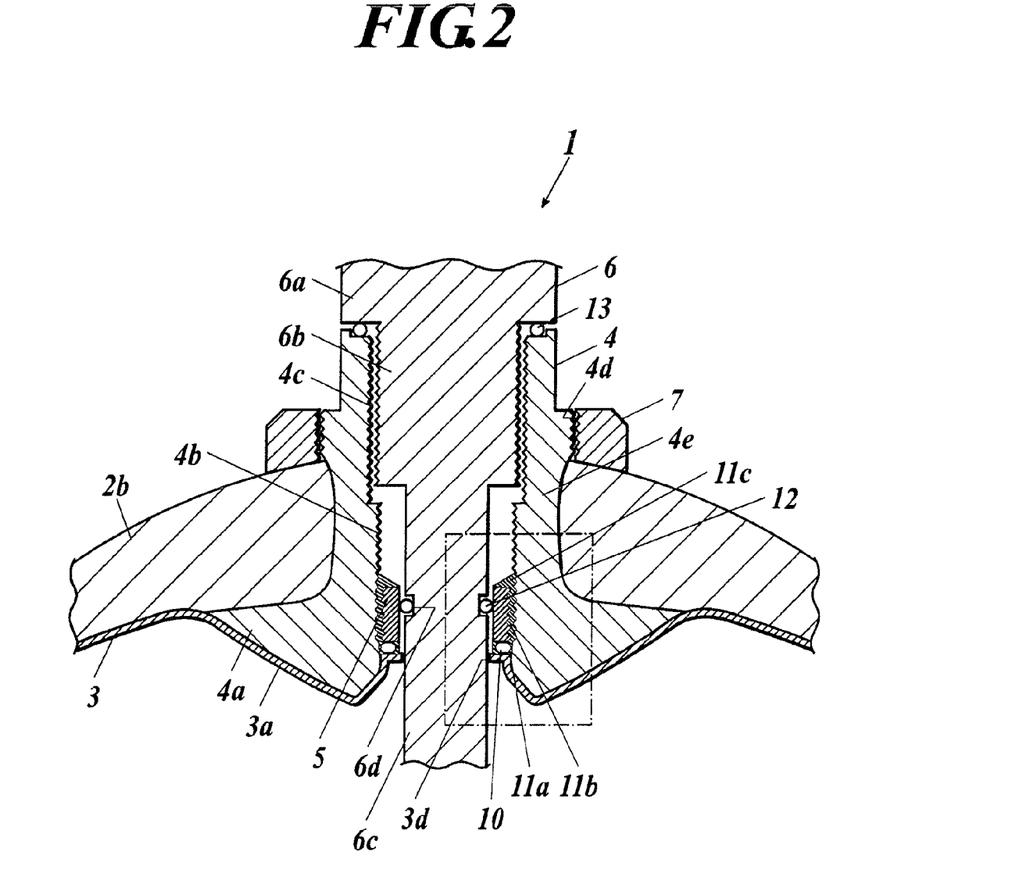
FIG. 2 is a sectional view of the mouth ring portion of the pressure-resistant container according to the first embodiment of the present invention.

FIG. 2 is a sectional view of a mouth ring portion of the pressure-resistant container 1. FIG. 3 is a partially enlarged view of FIG. 2. As shown in FIG. 2 or 3, an opening 3*d* connected to the mouth rings 4 is formed at the inner shell 3. The inner shell 3 is made of a resin and has a gas barrier property. That is, the inner shell 3 is a member to bear the function of a gas barrier in the pressure-resistant container 1. However, because the inner shell 3 is made of the resin and it is thin and easy to swell, the pressure resistance of the container is enhanced by the outer shell 2 made of the composite material of the fiber reinforced resin covering the inner shell 3. That is, the outer shell 2 is the member to bear the function of pressure resistance in the pressure-resistant container 1.

The mouth ring 4 is cylindrical. A flange 4*a* is formed at the end part of the mouth ring 4 at the inner side of the container. The peripheral part 3*a* of the opening 3*d* of the inner shell 3 covers the end surface of the mouth ring 4 at the inner side of the container (that is, the end surface of the flange 4a at the inner side of the container) by adhesion, welding or the like.

The circumference of the flange 4a is formed to be sharp, and an inner tapered surface t1 and an outer tapered surface t2 are formed on the end surface of the flange 4a at the inner side of the container.

The inner shell 3 (peripheral part 3a) covers the inner tapered surface t1 and the outer tapered surface t2 continuously to both of the inner tapered surface t1 and the outer tapered surface t2.

A cylindrical neck part 3b is formed at a part nearer to the opening 3d than the part of the peripheral part 3a that covers the inner tapered surface t1, and further, an extending part 3c is formed at a part even more nearer to the opening 3d (the peripheral part 3a includes the cylindrical neck part 3d and the extending part 3c).

The cylindrical neck part 3b covers a predetermined range n of the inner peripheral surface of the mouth ring 4 by the cylindrical neck part 3b peripherally contacting with the predetermined range. That is, the peripheral part 3a covers a predetermined range n of the inner peripheral surface of the mouth ring 4 continuously to the end surface (the inner tapered surface t1 and the outer tapered surface t2) of the mouth ring 4 at the inner side of the container by the peripheral part 3a peripherally contacting with the predetermined range n.

The extending part 3c is bent at the covered edge part P to extend from the covering part of the predetermined range n to the inner part of the mouth ring 4.

The inner peripheral surface of the mouth ring 4 has a stepped structure in which the diameter in the outer side of the container is larger. A female screw into which the pressing member 5 is screwed is formed at the inner side steps 4b. A female screw into which the screw part 6b of the valve 6 is screwed is formed at the outer side steps 4c.

The pressing member 5 is formed in a simple cylindrical shape and does not have a flange nor a taper. A male screw screwed into the inner side steps 4b of the mouth ring 4 is formed at the outer peripheral surface of the pressing member 5.

The valve 6 has a flange part 6a, the screw part 6b and an inner end part 6c in which the diameters become smaller stepwise toward the inner part of the container in order. A male screw screwed into the outer side steps 4c of the mouth ring 4 is formed at the outer peripheral surface of the screw part 6b. A circumferential groove 6d to hold an O-ring 12 (second seal) is formed on the outer peripheral surface of the inner end part 6c. A gas airway is formed at the valve 6, although it is not shown.

The pressure-resistant container 1 is manufactured by molding and curing the outer shell 2 by the filament winding method so that the outer shell 2 covers the outside of the inner shell 3 and the flanges 4a of the mouth rings 4, and so that the outer shell 2 makes the end part of the mouth ring 4 at the outer side of the container to project. The pressure-resistant container 1 thus has the structure in which the mouth ring 4 protrudes the outer shell 2 (dome part 2b). A male screw 4d screwed into a tightening nut 7 is formed at the outer peripheral surface of the end part of the mouth ring 4 projecting to the outer side of the outer shell 2 (dome part 2b).

The flange 4a is put between the outer shell 2 (dome part 2b) and the inner shell 3. There is nothing between the flange 4a and the outer shell 2 (dome part 2b), and the flange 4a and the outer shell 2 (dome part 2b) contact with each other.

Figure 3:
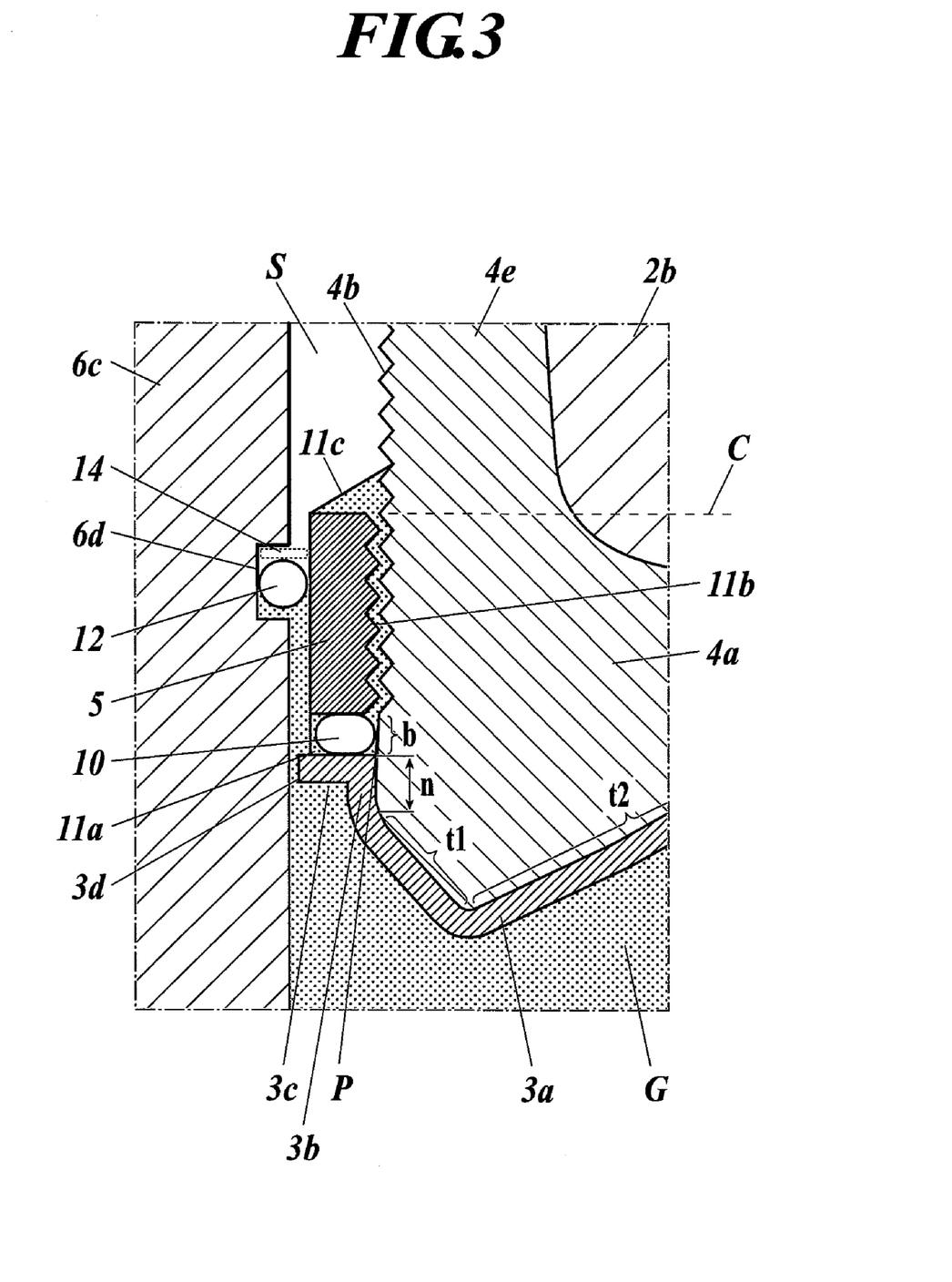
FIG. 3 is a partially enlarged view of FIG. 2.

The pressure-resident container 1 has the above described structure of each portion, and the pressing member 5 is screwed into the inner side steps 4b of the mouth ring 4, the screw part 6b of the valve 6 is screwed into the outer side steps 4c of the mouth ring 4, and the inner end part 6c is inserted into the hole part of the pressing member 5 as shown in FIGS. 2 and 3.

The O-ring 12 (second seal) held in the circumferential groove 6d is also disposed in the hole part of the pressing member 5 along with the inner end part 6c being inserted into the hole part of the pressing member 5. The O-ring 12 (second seal) seals between the outer peripheral surface of the inner end part 6c and the inner peripheral surface of the pressing member 5. The O-ring 12 (second seal) is disposed at a position more in the inner side of the container than a joining position C of the flange 4a and a cylindrical neck part 4e of the mouth ring 4.

Moreover, the flange part 6a presses the O-ring (third seal) onto the end surface of the mouth ring 4 at the outer side of the container. Thereby, the space between the flange part 6a and the end surface of the mouth ring 4 at the outer side of the container is sealed.

The first seal is composed of an O-ring 10 and a liquid sealant 11a. The liquid sealant 11a adheres to the O-ring 10 to cover the O-ring 10.

The first seal peripherally contacts with an inner peripheral surface b of the mouth ring 4 which is exposed between the inner shell 3 and the pressing member 5. Moreover, the first seal peripherally contacts with the surface of the extending part 3c of the inner shell 3 at the outer side of the container. Furthermore, the first seal peripherally contacts with the surface (O-ring pressing surface) of the pressing member 5 at the inner side of the container.

The surface of the extending part 3c of the inner shell 3 at the outer side of the container and the surface of the pressing member 5 at the inner side of the container are opposed to each other, and the inner peripheral surface b of the mouth ring 4 is exposed between the above surface of the extending part 3c of the inner shell 3 at the outer side of the container and the surface of the pressing member 5 at the inner side of the container.

The first seals peripherally contacts with the surface (the surface of the extending part 3c at the outer side of the container in the embodiment) of the inner shell 3 adjacent to the inner peripheral surface b.

The first seal peripherally contacts with the surface of the pressing member 5 adjacent to the inner peripheral surface b at the inner side of the container.

In such manner, the first seal peripherally contacts with each part of the inner peripheral surface b of the mouth ring 4 exposed between the inner shell 3 and the pressing member 5, the periphery of the opening 3d of the inner shell 3 adjacent to the inner peripheral surface b and the pressing member 5 in an integral manner.

The liquid sealant 11a of the first seal always peripherally contacts with the above mentioned three surfaces.

The O-ring 10 of the first seal peripherally contacts with the above mentioned three surfaces at least when a predetermined pressure or more is loaded thereon.

In addition to the first to third seals, a liquid sealant 11b is attached between the outer peripheral surface of the pressing member 5 and the inner peripheral surface (the inner side steps 4b) of the mouth ring 4 opposed to the outer peripheral surface of the pressing member 5 in order to perform a greater sealing.

With the same object, a liquid sealant 11c is attached between the surface of the pressing member 5 at the outer side of the container and the inner peripheral surface (the inner side step 4b) of the mouth ring 4.

Next, the sealing property and the high pressure resistance of the pressure-resistant container 1 will be further described.

The mouth ring 4 and the inner shell 3 are joined to each other by adhesion or welding. The area of the flange 4a of the mouth ring 4 has an aspect of being determined by the factor of the strength thereof. However, the area is determined mainly for securing the joining area of the inner shell 3 and the mouth ring 4 wherein the joining area is needed as a seal. Consequently, sufficient sealing can be carried out by the adhesion or the welding. Moreover, because the resin inner shell 3 has sufficient flexibility comparing to the composite material, such as CFRP, of the outer shell 2, the inner shell 3 is pressed to the mouth ring 4 by the internal pressure of the tank, and thereby, the sealing property is improved.

As shown in FIG. 3, a high pressure gas G is filled in the inner side of the first and second seals. It is important not to expose the covered edge parts P of the inner shell 3 and the mouth ring 4 to the internal gas in order to keep the sealing property in a good condition. When the covered edge part P is exposed to the internal gas, then the interfacial peeling or the like of the inner shell 3 and the mouth ring 4 from the covered edge part P occurs by the pressure of the internal gas, and there is a possibility that a gas leakage occurs.

In the pressure-resistant container 1, the O-ring 10 which is loaded with a pressure by the high pressure gas G deforms so as to enlarge its diameter, and the O-ring 10 contacts with the inner peripheral surface b of the mouth ring 4 by a pressure. Moreover, the O-ring 10 loaded with the pressure by the high pressure gas G deforms in its cross section, and the O-ring 10 contact with the surface of the pressing member 5 at the inner side of the container and the extending part 3c of the inner shell 3 to adhere closely to both of them in larger area. In this way, the sealing property of the container is enhanced by the O-ring 10 when a high presser is load.

The valve 6 is secured by the screwing of the screw part 6b of the valve 6 into the female screw of the mouth ring 4 at the outer side steps 4c. The O-ring 12 is held in the circumferential groove at the inner end part 6c, and sealing is carried out between the inner end part 6c and the surface of the pressing member 5 at the inner side. Because the pressing member 5 (ring) can be manufactured with high accuracy by a machining process, the surface accuracy necessary for sealing can be easily secured.

Furthermore, in the pressure-resistant container, the O-ring 12 which is loaded with a pressure by the high pressure gas G causes a deformation in its cross section, and the O-ring 12 contacts with the inner peripheral surface of the pressing member 5 and the bottom of the circumference groove 6d with pressure to adhere closely to both of them. In this way, the sealing property is enhanced by the O-ring 12 when a high pressure is loaded.

Generally, the surface accuracy of the surface to which an O-ring is applied is strictly regulated in order to secure the sealing performance, and a sufficient sealing can be obtained only by the O-ring. However, because the resin inner shell 3 cannot secure the surface accuracy at the sealing part, the liquid sealant 11a is used together in the first seal, and thereby the reliability of the sealing is improved.

As described above, the covered edge part P and the periphery are blocked from the high pressure gas G by the first seal composed of the O-ring 10 and the liquid sealant 11a, and the occurrence of a large stress to the covered edge part P is prevented. Consequently, the occurrence of gas leakage due to the occurrence of the interfacial peeling and the like of the inner shell 3 and the mouth ring 4 from the covered edge part P is prevented.

Furthermore, the O-ring 12 (second seal) seals the space between the outer peripheral surface of the inner end part 6c of the valve 6 and the inner peripheral surface of the pressing member 5, and consequently the high pressure gas G is prevented from entering the outside space S of the O-ring 12. Consequently, the high pressure gas G will not enter the covered edge part P of the inner shell 3 and the mouth ring 4 from out side of the pressing member 5 by going around the end part of the pressing member 5 at the outer side of the container, and the gas sealing property of the covered edge part P of the inner shell 3 and the mouth rings 4 can be enhanced.

When the high pressure gas G leaks to the outside space S of the O-ring 12, there is a possibility that not only the pressure at the outer side of the O-ring 12 increases but also the pressure at the outer side of the O-ring 10 increases. When the pressure at outer side of both of the O-rings 12 and 10 increase, then the pressure difference between the inside and the outside of the container decreases. Consequently, the O-rings 12 and 10 do not sufficiently deform as described above, and the sealing property cannot be exercised.

Accordingly, the pressure-resistant container 1 is provided with not only the first seal (O-ring 10 and liquid sealant 11a) but also with the second seal (O-ring 12) together, and thereby the gas sealing property is enhanced. Thus the high pressure resistance of the container is realized.

The liquid sealants 11b and 11c operate so as to make it more difficult for the gas to enter the covered edge part P from the outside space S by going round outside of the pressing member 5.

By the inner shell 3 covering not only the end surfaces (tapered surfaces t1 and t2) of the mouth ring 4 at the outer side of the container but also the predetermined range n of the inner peripheral surface, the joining strength between the inner shell 3 and the mouth ring 4 increases, and then the gas sealing property and the pressure resistance are enhanced.

By forming the extending part 3c in the inner shell 3, even when the thin inner shell 3 is used, the seat for the O-ring 10 can be secured, and the thickness from the surface of the liquid sealant 11a to the covered edge part P can be secured so as to be thick. Consequently, the gas sealing property can be enhanced.

The flange 4a is also for latching the mouth ring 4 to the outer shell 2 for preventing the mouth ring 4 from springing outside when the mouth ring 4 receives an internal pressure in addition for securing the covered area of the inner shell 3 and the mouth ring 4 so as to be large.

The tightening nut 7 is for latching the mouth ring 4 to the outer shell 2 so that the mouth ring 4 does not fall in the inner part of the container when the mouth ring 4 receives a load in the inner direction of the container.

That is, the mouth ring 4 is fixed to the outer shell 2 with the flange 4a and the tightening nut 7.

The joining part of the cylindrical neck part 4e and the flange 4a of the mouth ring 4 is not only under a severe condition in the aspect of the strength by the bending load caused by the deformation of the tank at the time of pressure loading and the load caused by the internal pressure of the tank acting thereto, but also the joining part causes a great deformation of the mouth ring 4. In this case, a large gap is generated between the pressing member 5 and the mouth ring 4 to reduce the sealing performance. Moreover, because a similar situation occurs between the valve 6 and the pressing member 5, it is especially important for the sealing performance that the deformation at the joining part of the mouth ring 4 is small. In the pressure-resistant container 1, because the O-ring 12 (second seal) is disposed at a position more in the inner side of the container than the joining position C of the flange 4a and the cylindrical neck part 4e of the mouth ring 4, the internal pressure of the tank does not operate directly to the joining part of the cylindrical neck part 4e and the flange 4a of the mouth ring 4. Thereby, at least the deformation due to the internal pressure of the tank does not occur, and the sealing performance can be enhanced.

For the second seal, a back-up ring 14 (shown in FIG. 3 by a broken line) to the O-ring 12 can be applied according to the size of the gap to be sealed to improve the sealing property.

As described above, a high gas sealing property and a high pressure resistance can be realized.

Next, a manufacturing method of the pressure-resistant container 1 will be described.

The inner shell (liner) 3 is manufactured by a blow molding in advance, and the mouth ring 4 made of a metal which has the flange 4a is separately manufactured. The mouth ring 4 is attached to the inner shell 3 by the adhesion or welding of the inner shell 3 and the flange 4a. In the case of the adhesion, an adhesive is applied to predetermined ranges of both of the mouth ring 4 and the inner shell 3, and the adhesion is carried out while pressurizing the mouth ring 4 and the inner shell 3. The pressurization is continued to be loaded until the curing of the adhesive with a specialized jig.

Next, a liquid sealant is applied (the application of the liquid sealants 11a and 11b) to the extending part 3c of the inner shell 3, the flat surface part that is the end surface of the pressing member 5 at the inner side of the container, the male screw part at the outer periphery of the pressing member 5 and the inner peripheral surface (female screw part) of the mouth ring 4 opposed to the male screw part, and the O-ring 10 is placed on the extending part 3c.

Next, the pressing member 5 is screwed and entered into the female screw of the inner side steps 4b of the mouth ring 4, and the O-ring 10 is squashed to a predetermined squashing amount. Next, the end part of the pressing member 5 at the outer side of the container is further sealed by a liquid seal (the placement of the liquid sealant 11c).

Next, the valve 6 in which the O-ring 12 is fitted in the circumferential groove 6d is screwed into the female screw at the outer side steps 4c of the mouth ring 4 to be tightened into the predetermined positions. At this time, the O-ring 13 placed at the upper end of the mouth ring 4 in advance is pressed with the flange part 6a of the valve 6 to carry out the third seal. A back-up ring may be applied to the O-ring 13, although the back-up ring is not shown.

Next, the outer shell 2 to cover the inner shell 3 and the flange 4a is molded by the filament winding method. Before the curing of the resin constituting the outer shell 2, the tightening nut 7 is screwed into the male screw 4d of the mouth ring 4, and the outer shell 2 is tightened with the flange 4a and the stuffing nut 7. After that, the resin is cured. Adhesives (in paste form) may be applied to the surface of the nut 7 contacting with the outer shell 2 as needed.

By the above process, the pressure-resistant container 1 is completed.

As described above, the blow molding technique which has good productivity can be applied to the manufacturing of the inner shell 3, and the mouth ring configured separately can be attached to the inner shell by adhesion, welding and the like. Consequently, the pressure-resistant container can be simply manufactured and the cost of the manufacturing can be reduced.

Here, by removing the valve 6 from the mouth ring 4, the maintenance and replacement of the O-rings 12 and 13 can be carried out easily. By removing the valve 6 from the mouth ring 4, the condition of the O-ring 10, the pressing member 5, the liquid sealants 11a, 11b, and 11c, and the extending part 3c can be confirmed. The O-ring 10, the pressing member 5, and the liquid sealants 11a, 11b, and 11c can be reconstructed as needed.

[Second Embodiment]

Figure 4:
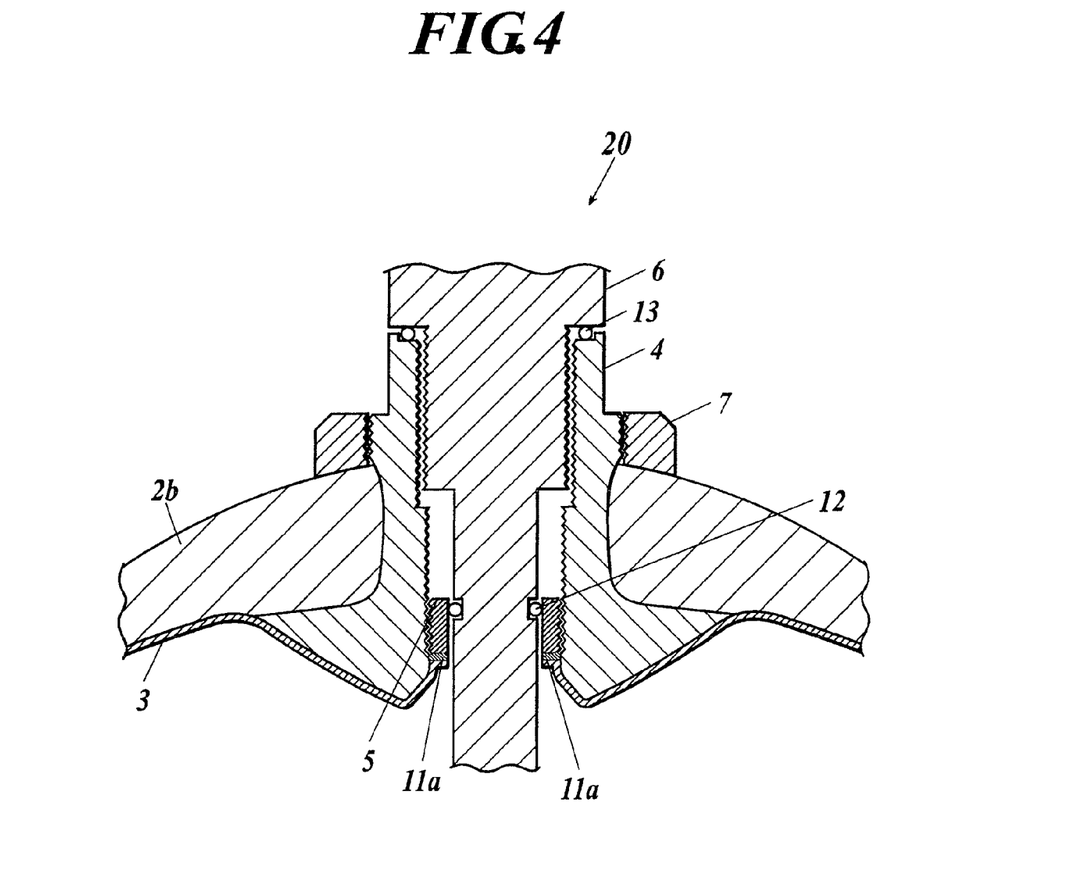
FIG. 4 is a sectional view of the mouth ring portion of the pressure-resistant container according to the second embodiment of the present invention.

Next, a second embodiment of the present invention will be described with reference to FIG. 4. FIG. 4 is a sectional view of a mouth ring portion of the pressure-resistant container according to the second embodiment of the present invention. The pressure-resistant container 20 of the embodiment is different from the pressure-resistant container 1 of the first embodiment in that the O-ring 10 constituting the first seal is excluded and that the first seal is composed only with the liquid sealant 11a. The liquid sealants 11b and 11c are not shown. However, they may be provided.

As described above, in the case of the pressure-resistant container 1 of the first embodiment, the reliability of the sealing is improved by using the liquid sealant 11a in addition to the O-ring 10 as the first seal.

When the O-ring 10 is applied, there is an advantage that an uniform sealing part can be obtained comparing to when only the liquid sealant 11a is used. However, in the case where an ultrahigh pressure is caused, the sealing may break due to the cycle fatigue by the deformation of the O-ring becoming great and by the great bending deformation occurring in the extending part 3c of the inner shell 3 which contacts with the O-ring 10. In such case, the pressure-resistant container 20 of the embodiment which only uses the liquid sealant 11a and which does not apply the O-rings 10 is effective.

[Third Embodiment]

Figure 5:
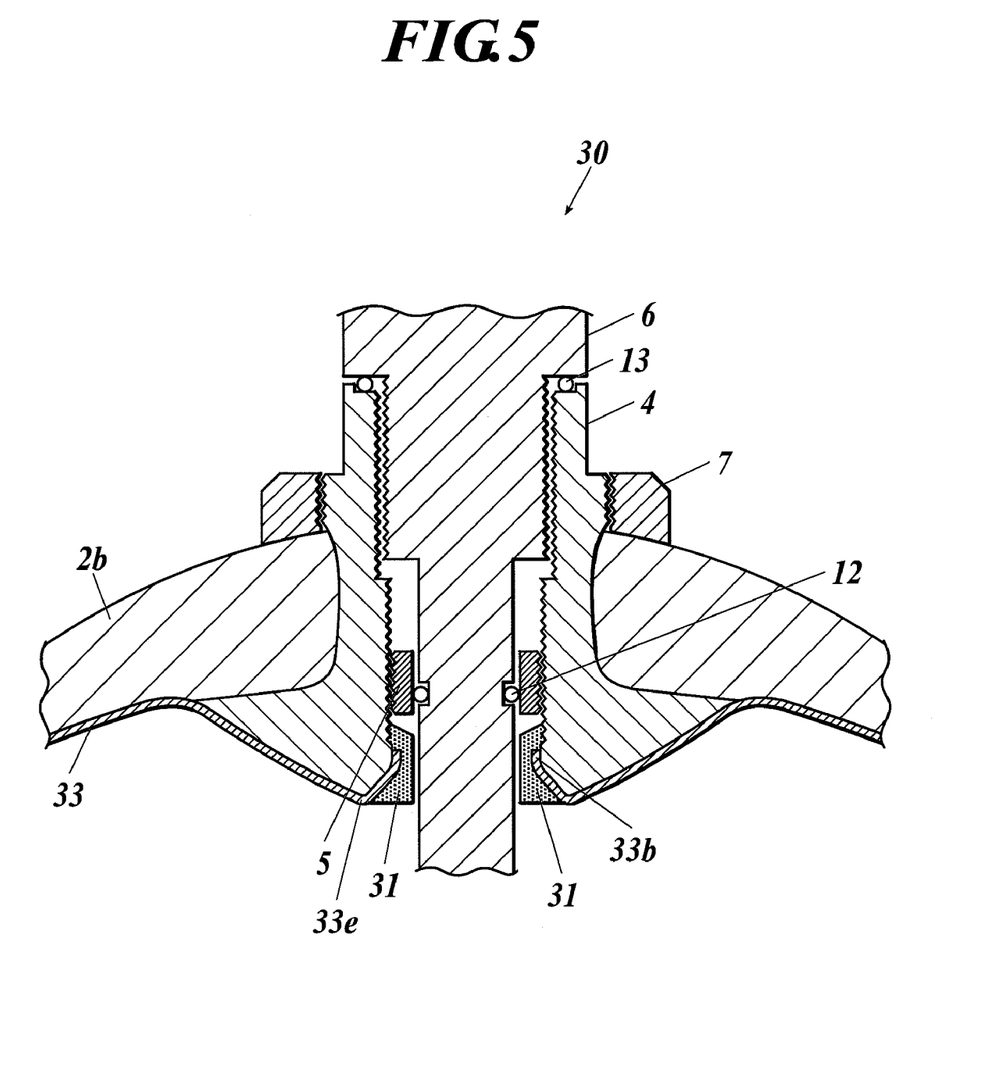
FIG. 5 is a sectional view of the mouth ring portion of the pressure-resistant container according to the third embodiment of the present invention.

Next, a third embodiment of the present invention will be described with reference to FIG. 5. FIG. 5 is a sectional view of a mouth ring portion of the pressure-resistant container according to the third embodiment of the present invention. The pressure-resistant container 30 of the embodiment is different from the pressure-resistant container 20 of the second embodiment in that the first seal is a liquid sealant 31 and that the liquid sealant 31 peripherally contacts with and covers the inner peripheral surface of the mouth ring 4 which is exposed between the inner shell 33 and the pressing member 5 and periphery of the opening of the inner shell 3 and does not contact with the pressing member 5. It is preferable that the liquid sealants 11b and 11c are provided to the pressing member 5 similarly as in the first embodiment, although they are not shown.

As shown in FIG. 5, the inner shell 33 covers along the mouth ring 4 to the circumference of the opening of the inner shell 33 in the embodiment. In the embodiment, the extending part 3c is not provided as in the first and second embodiments, and the circumference of the opening of the inner shell 33 of the embodiment forms the cylindrical neck part 33b and covers the inner peripheral surface of the mouth ring 4.

The liquid sealant 31 covers from the peak part 33e to the cylindrical neck part 33b of the inner shell 33 which covers the boundary of the inner tapered surface t1 and the outer tapered surface t2 (see FIG. 3) of the flange 4a, and further covers the inner peripheral surface of the mouth ring 4 which is exposed at more in outer side of the container than the cylindrical neck part 33b. The liquid sealant 31 is formed so as not to project more in the inner side of the container than the peak part 33e, and the liquid sealant 31 may not cover the peak part 33e itself.

Hereinafter, the forming method of the liquid sealant 31 will be described with reference to FIG. 6.

First, the mouth ring 4 is attached to the inner shell 33 similarly as in the first embodiment.

Figure 6:
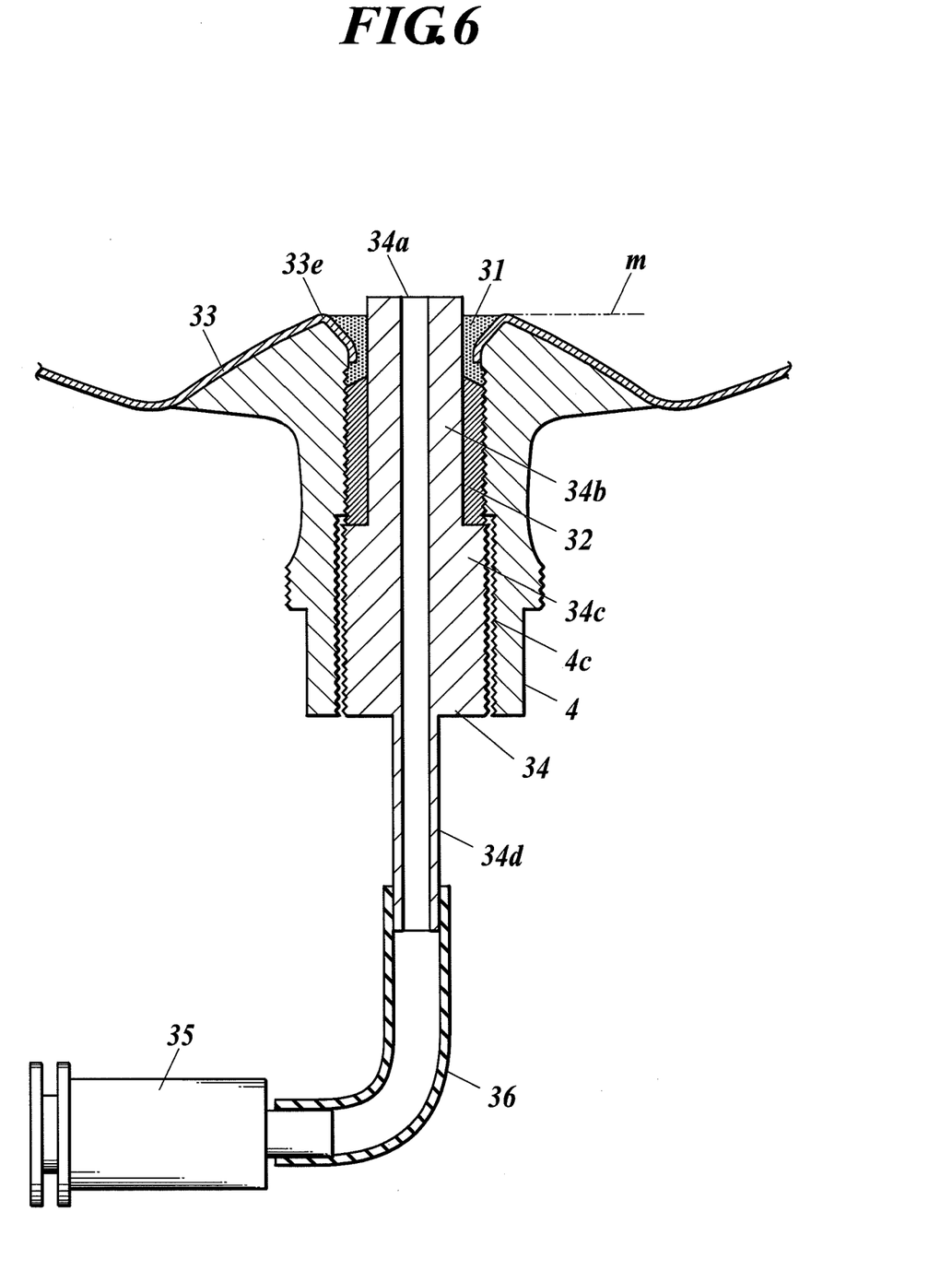
FIG. 6 is a view for explaining the forming method of the liquid sealant in the third embodiment of the present invention.

Then, as shown in FIG. 6, the inner shell 33 is fixed in the manner where the mouth ring 4 is placed in the lower side, and a stepped pipe 34 having a male screw part 34c to be screwed into the female screw at the outer side steps 4c of the mouth ring 4 at the outer periphery of the stepped pipe 34 is inserted into the mouth ring 4. The pipe 34 is screwed and entered into the mouth ring 4, and the pipe 34 is placed so that the front end 34a of the pipe 34 is placed at an upper position than the height position m of the peak part 33e.

A part where it is not sealed by the liquid sealant 31 is previously sealed with a sealing tape 32 or the like so that the liquid sealant 31 does not enter therein.

The liquid sealant is poured into the container through the pipe 34 with a syringe 35 or the like connected to the external end part 34d of the pipe 34 via a tube 36. The liquid sealant overflows from the pipe 34, and drops by the gravity to be filled between the mouth ring 4 and the end part 34b of the pipe 34 and between the inner shell 33 and the end part 34b of the pipe 34.

The liquid sealant is poured by an amount in which the poured liquid sealant does not exceed a line m which is the amount specified by a preparatory experimental production in advance. After the curing of the liquid sealant 31, the pipe 34 is pulled out. The mold release processing is carried out to the end part 34b of the pipe 34 before the insertion of the pipe 34 in order to prevent the adhesion of the end part 34b and the liquid sealant.

Here, the whole disclosure of Japanese Patent Application 2006-91106 filed on Mar. 29, 2006 is incorporated herein by reference in its entirety.

Industrial Applicability

The present invention can be used for a high pressure gas, such as compressed hydrogen, as a pressure-resistant container superior in its gas sealing property.

Description Of Marks
  C joining position
  P covered edge part
  G high pressure gas
  1 pressure-resistant container (first embodiment)
  2 outer shell
  3 inner shell
  3a peripheral part
  3b cylindrical neck part
  3c extending part
  3d opening
  4 mouth ring
  4a flange
  4e cylindrical neck part
  5 pressing member
  6 valve
  6a flange part
  6c inner end part
  6d circumferential groove
  6b outer side step
  6b screw part
  7 tightening nut
  10 O-ring (first seal)
  11a liquid sealant (first seal)
  11b, 11c liquid sealant
  12 O-ring (second seal)
  13 O-ring (third seal)
  20 pressure-resistant container (second embodiment)
  n predetermined range of inner peripheral surface of mouth ring

The invention claimed is:

1. A pressure-resistant container, comprising:
   an inner shell;
   an outer shell to cover the inner shell;
   a cylindrical mouth ring to penetrate the outer shell to be connected to an opening formed at the inner shell, a peripheral part of the opening at the inner shell covering an end surface of the mouth ring at an inner side of the container;
   a cylindrical pressing member screwed into an inner peripheral surface of the mouth ring;
   a first seal peripherally contacting with the inner peripheral surface of the mouth ring, which extends between the inner shell and the pressing member, and with a periphery of the opening of the inner shell in an integral manner;
   a valve having a screw part screwed into the inner peripheral surface of the mouth ring at an outer side of the container than the pressing member and having an inner end part inserted into a hole part of the pressing member; and
   a second seal for sealing between an outer peripheral surface of the inner end part and an inner peripheral surface of the pressing member.

2. The pressure-resistant container as claimed in claim 1, wherein the first seal comprises a liquid sealant.

3. The pressure-resistant container as claimed in claim 1, wherein the first seal is an O-ring and a liquid sealant adhering to the O-ring.

4. The pressure-resistant container as claimed in claim 1, wherein a liquid sealant is attached between an outer peripheral surface of the pressing member and the inner peripheral surface of the mouth ring opposed to the outer peripheral surface of the pressing member.

5. The pressure-resistant container as claimed in claim 1, wherein a liquid sealant is attached between an end surface of the pressing member at an outer side of the container and the inner peripheral surface of the mouth ring.

6. The pressure-resistant container as claimed in claim 1, wherein the inner shell is made of a resin, and the outer shell is made of a composite material of a fiber reinforced resin.

7. The pressure-resistant container as claimed in claim 1, wherein the peripheral part covers a predetermined range of the inner peripheral surface of the mouth ring by peripherally contacting with the predetermined range continuously to the end surface of the mouth ring at the inner side of the container.

8. The pressure-resistant container as claimed in claim 7, wherein the peripheral part comprises an extending part which extends from a covering part of the predetermined range toward an inner part of the mouth ring, and the first seal peripherally contacts with the extending part.

9. The pressure-resistant container as claimed in claim 1, wherein a flange which is sandwiched between the outer shell and the inner shell is formed at an end part of the mouth ring at the inner side of the container.

10. The pressure-resistant container as claimed in claim 9, wherein the second seal is disposed at an inner side of the container than a joining position of the flange and a cylindrical neck part of the mouth ring.

11. The pressure-resistant container as claimed in claim 1, wherein the second seal is an O-ring.

12. The pressure-resistant container as claimed in claim 11, wherein a circumferential groove to hold the O-ring of the second seal is formed at an outer peripheral surface of the inner end part.

13. The pressure-resistant container as claimed in claim 1, wherein a flange part is provided at an end part of the valve at an outer side of the container, and a third seal is provided to seal a part between the flange part and an end surface of the mouth ring at the outer side of the container.

14. The pressure-resistant container as claimed in claim 13, wherein the third seal is an O-ring.

15. The pressure-resistant container as claimed in claim 1, wherein the first seal peripherally contacts with the inner peripheral surface of the mouth ring, which extends between the inner shell and the pressing member, the periphery of the opening of the inner shell and the pressing member in the integral manner.

16. The pressure-resistant container as claimed in claim 15, wherein the peripheral part covers a predetermined range of the inner peripheral surface of the mouth ring by peripherally contacting with the predetermined range continuously to the end surface of the mouth ring at the inner side of the container.

17. The pressure-resistant container as claimed in claim 16, wherein the peripheral part comprises an extending part which extends from a covering part of the predetermined range toward an inner part of the mouth ring, and the first seal peripherally contacts with the extending part.

* * * * *